(No Model.)
R. C. TOMPKINS.
Hog Scraping Machine.
No. 239,888. Patented April 5, 1881.
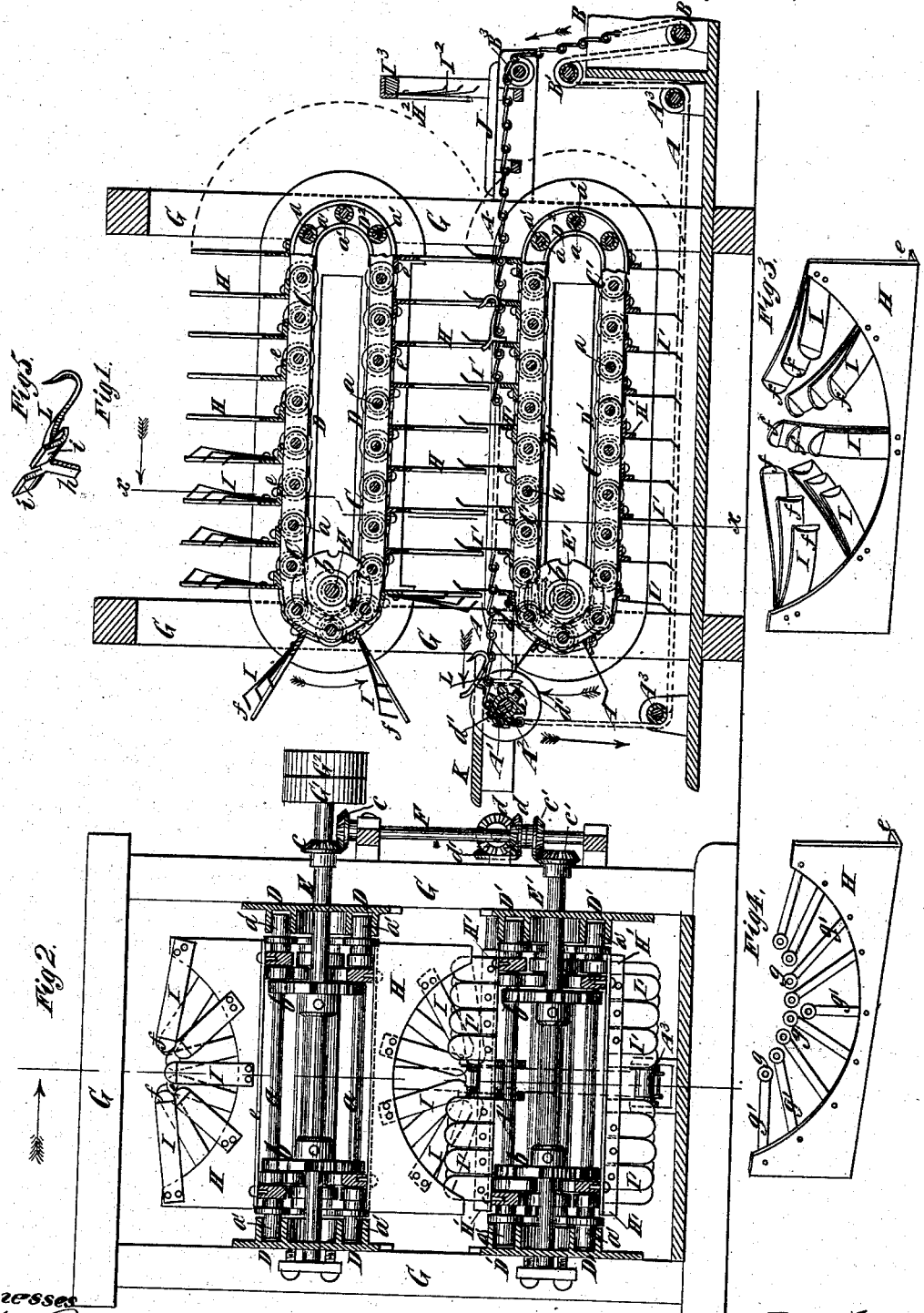

UNITED STATES PATENT OFFICE.

RHINELANDER C. TOMPKINS, OF NEW YORK, ASSIGNOR OF ONE-HALF TO AMASA SPRING, OF WHITE PLAINS, N. Y.

HOG-SCRAPING MACHINE.

SPECIFICATION forming part of Letters Patent No. 239,888, dated April 5, 1881.

Application filed October 23, 1880. (No model.)

*To all whom it may concern:*

Be it known that I, RHINELANDER C. TOMPKINS, of the city and county of New York, in the State of New York, have invented certain new and useful Improvements in Hog Scraping or Depilating Machines, of which the following is a specification.

My invention relates to hog scraping or depilating machines in which the carcasses, after being scalded, are attached by hooks to a carrier-chain, by which they are drawn over, past, and in contact with scrapers or scraping devices.

The invention consists in the combination, with such carrier, of endless chains arranged upon opposite sides of said carrier and carrying scrapers or scraping devices, which preferably have an elastic or yielding connection with said chains, the carrier being made to travel in an opposite direction from that of the portions of the scraping-chains, between which it passes. The scrapers or scraping devices are preferably fixed to bases or supports which consist of plates projecting from the faces of the chains and having concave outer edges, whereby the scrapers or scraping devices are made to converge toward their scraping-edges, and the scrapers or scraping devices upon each base or support are preferably arranged intermediately between those upon the adjacent supports.

The invention also consists in a novel arrangement of scrapers or scraping devices, and in a novel means of detaching the hooks by which the carcasses are attached to the carrier from said carrier after they have passed over, through, or between the scraping-chains.

The invention also consists in various details of construction and combination of parts, hereinafter to be explained.

In the accompanying drawings, Figure 1 represents a longitudinal section of a machine embodying my invention. Fig. 2 represents a transverse section upon the dotted line $x\,x$, Fig. 1. Fig. 3 represents a perspective view of one of the bases or supports which project from the scraping-chains. Fig. 4 represents a perspective view of a base or support having attached to it scrapers or scraping devices of modified form, and Fig. 5 represents a perspective view of one of the hooks employed for attaching the carcasses to the carrier.

Similar letters of reference designate corresponding parts in all the figures.

A designates a carrier, here shown as consisting of an endless chain, by which the carcasses, after being scalded, are carried or drawn forward through, over, or in contact with the scrapers or scraping devices.

A' designates a sprocket-wheel mounted upon the transverse shaft $A^2$, and serving to impart motion to the carrier A, at a regular progressive speed, in one direction.

B designates a scalding-tub, from which the carcasses are taken by the carrier A and drawn through the machine.

$A^3$ designates guide-pulleys, around which the carrier A passes, and in order to provide for conveniently arranging an ascending portion of the carrier in the scalding-tub B without passing it through the bottom thereof, I employ a novel arrangement of pulleys, B' $B^2$ $B^3$, around which the carrier passes. The pulley B' is mounted in suitable bearings upon the edge of the scalding-tub. The pulley $B^2$ is mounted in the bottom thereof, and the pulley $B^3$ is mounted above the tub, the carrier passing over the pulley B', thence under the pulley $B^2$, and finally over the pulley $B^3$, and in a horizontal direction through the machine.

The arrangement of the carrier A and the pulleys B' $B^2$ $B^3$ constitutes no part of my present invention, but constitutes the subject of another application for Letters Patent.

C C' designate two chains, arranged one above and the other below the carrier A, and having a regular progressive motion imparted to them, so that the portions which are adjacent to the carrier A travel in the opposite direction to the said carrier. As clearly shown in Fig. 2, the chains C C' are nearly the width of the machine, the links being arranged in pairs and connected by pins or bars $a$, the links of each pair being considerably separated from each other. The ends of the link pins or bars $a$ fit in tracks D D' upon opposite sides of the machine, the two parallel portions of each track being connected at the ends by semicircular portions $D^2$, of sufficiently large curvature to accommodate the chains. The ends of the pins $a$ are preferably fitted with rollers $a'$ to reduce friction.

E E' designate two shafts, arranged one above the other, each being concentric with the center, from which the curved end portions $D^2$ are struck, and serving to impart motion to the two chains C C'. Upon the shafts E E' are arranged sprocket-wheels $b$, which engage with the pins or rods $a$ of the chains and impart motion to them. The two shafts E E' are connected together, so as to be driven at a uniform rate by means of a vertical shaft, F, mounted in suitable bearings attached to the frame-work G of the machine, and two pairs of bevel-gear wheels, $c\ c\ c'\ c'$, as shown clearly in Fig. 2, and motion is imparted to both chains C C' by means of a belt upon the pulleys $G'\ G^2$ mounted upon the shaft E, or by any other suitable means. In this example of my invention the shaft $A^2$, which carries the sprocket-wheel A', by the rotation of which the carrier A is drawn forward, is connected by bevel-gears $d\ d\ d'\ d'$ with the upright shaft F, so that both the carrier A and the scraping-chains C C' are driven at a proportional velocity, whether the speed of rotation be greater or less; but in some cases it might be desirable to rotate the carrier-shaft $A^2$ from mechanism separate from and independent of the chains C C'.

As before stated, the chains C C' have attached to them scrapers or scraping devices, and I will now proceed to describe fully the character and arrangement of such scrapers or scraping devices.

H H' designate bases or supports, to which are attached the scrapers or scraping devices. As here shown, these bases or supports consist simply of pieces of sheet or plate metal, arranged transversely to the chains C C' and secured to the chains by having the edge turned over, so as to form a flange or foot, $e$, which is bolted or riveted to the chain-links. The bases or supports H, which are attached to each pair of links of the chain C, are concave upon their upper or outer edges, as clearly shown in Figs. 2 and 3; but the bases or supports H', attached to the chain C', are straight upon their edges.

Any desirable form of scrapers or scraping devices may be employed and attached to the bases or supports in any suitable manner. The scrapers or scraping devices should either be composed of elastic material or have elastic arms for connecting them with their bases or supports, or the arms may be rigid and have an elastic connection with the bases or supports. The scrapers or scraping devices might be rigidly attached to the bases or supports, and said bases or supports have an elastic or yielding connection with the chain-links, so as to be capable of being deflected bodily with all the scrapers or scraping devices attached thereto.

I designates the scrapers, which are attached to the bases or supports H of the upper chain, C. They consist of one, two, three, or more strips of elastic metal, such as thin sheet-steel, having salient rounded scraping ends or edges, which are preferably slightly deflected or bent up at an angle to the body of the scrapers, as seen clearly at $f$ in Fig. 3. As there shown, these scrapers are secured to the bases or supports in groups, each comprising three scrapers, placed one upon the other, and secured to the base or support by riveting or otherwise. Where the scrapers I are arranged in groups, as shown, the scrapers of each group are of different lengths, so that when deflected by the passage of a carcass they will bear upon the carcass with uniform pressure, and each do effective work.

It will be observed that the scrapers I all converge toward their scraping ends or edges, and also that the scrapers of each base or support H are alternated or placed opposite the spaces between the scrapers upon adjacent bases or supports.

The scrapers I', which are connected to the bases or supports H' of the chain C', are very similar to the scrapers I, except that they are not arranged in groups, but singly, and they do not converge, but are parallel with each other. The scrapers I' upon each base or support H' are arranged opposite the spaces between the scrapers upon the adjacent bases or supports, as previously described with reference to the scrapers I.

In lieu of the scrapers just described, I may employ scrapers of the kind shown in Fig. 4, consisting of disks or hemispherical cup-like scrapers $g$, attached by means of elastic arms $g'$ to the base or support H.

It is obvious that although the scraping-chains and the carrier are here represented as traveling in an approximately-horizontal plane, they might be arranged to travel vertically or at an incline, if desired.

J designates a table arranged in close proximity to the scalding-tub B, and upon which men may stand to pull the long hair from the backs of the carcasses before they pass to the scrapers or scraping devices.

K designates a delivery-table upon which the carcasses are delivered after passing through or past the scraping devices.

L, Fig. 5, designates a hook of the form that is employed for attaching the carcasses to the carrier. This hook is provided with a downwardly-projecting prong or arm, $h$, which engages with the carrier, and it is also provided with two laterally-projecting wings, $i$, the purpose of which will presently be explained.

It is very desirable that as the carcasses are drawn through the machine and to the delivery-table K they should be automatically detached from the carrier. In the present example of my invention this is effected by constructing the sprocket-wheel A', over which the carrier A passes, with flanges of large diameter, and as the hooks approach said wheel the wings $i$, with which they are provided, ride upon the large flanges of the wheel, thus disengaging the prong or arm h from the carrier, and enabling the carcasses to be rolled off to one side upon the delivery-table K.

Though the scrapers or scraping devices I, arranged in groups with their bent-up or deflected edges or ends f, are only shown in connection with a scraping-chain, they are applicable for use in other ways.

In order to separate the bristles, which grow upon the back of the hog principally, and which are used for brush-making, from the hair, I may employ a scraping device or devices arranged over the table J, which is in proximity to the scalding-tub, and adapted to bear upon the back of the carcasses before they pass through or between the scraping-chains or other scraping devices, which completely depilate the carcasses. Though any suitable scraping devices may be placed in such position, I prefer to use a base or support, H², similar to the bases or supports H, provided with scrapers I², and secured in an inverted position to a beam, I³, or other support. This removes the bristles much more easily than could be done by hand, as heretofore practiced.

What I claim as my invention, and desire to secure by Letters Patent, is—

1. The combination, with a carrier for carcasses, of endless chains arranged upon opposite sides of said carrier, and carrying scrapers or scraping devices, substantially as and for the purpose specified.

2. The combination, with a traveling carrier for carcasses, of endless chains arranged to travel upon opposite sides of said carrier, and elastic or yielding scrapers or scraping devices attached to said chains, substantially as and for the purpose specified.

3. The combination, with a traveling carrier for carcasses, of endless chains arranged to travel upon opposite sides of said carrier, bases or supports rigidly connected to the links of said chains, and elastic or yielding scrapers or scraping devices attached to said bases or supports, substantially as and for the purpose specified.

4. The combination, with a traveling carrier for carcasses, of endless chains arranged to travel on opposite sides of said carrier, bases or supports rigidly connected to the links of said chains, and having concave edges, and elastic or yielding scrapers or scraping devices attached to the concave edges of said bases or supports, and converging toward their free ends, substantially as specified.

5. The combination, in a hog scraping or depilating machine, with a traveling carrier, a scalding-tub, and scraping devices between which the carcasses are drawn and which bear upon all sides thereof, of a scraping device or devices arranged over the said carrier and between the said scalding-tub and first of said scraping devices, and adapted to bear upon the backs of the carcasses only, substantially as and for the purpose specified.

6. In a hog scraping or depilating machine, two or more scrapers of different lengths arranged one upon the other, and each composed of a strip or piece of elastic material having a salient rounded edge, substantially as specified.

7. In a hog scraping or depilating machine, two or more scrapers of different lengths arranged one upon the other, and each composed of a strip or piece of elastic material having salient rounded edge, bent or deflected at an angle to the body, substantially as specified.

8. In a hog scraping or depilating machine, the combination of a traveling carrier, endless chains arranged on opposite sides of said carrier, bases or supports rigidly connected with said chains and having concave edges, and a series of scrapers attached to the concave edge of each base or support and converging toward their free ends, and each scraper having a salient rounded edge bent or deflected at an angle to its body, substantially as specified.

9. The combination, with the chain C, of the concave bases or supports H attached thereto, and the scrapers I, of different lengths, arranged in groups of two or more, and having the deflected or bent ends f, substantially as specified.

10. The combination of a traveling carrier for carcasses, a flanged wheel or pulley over which said carrier passes, and a carcass-hook having a downwardly-projecting prong for engaging with said carrier and lateral wings for engaging with the flanges of said wheel or pulley, substantially as and for the purpose specified.

11. The combination of the carrier A, the shaft A², and wheel A', the chains C C', the tracks D D' D², the shafts E E' F, and bevel-gear wheels c c c' c' d d d' d', all substantially as specified.

R. C. TOMPKINS.

Witnesses:
   A. C. WEBB,
   THOMAS E. BIRCH.